United States Patent

Vogelsberg

[15] 3,651,391

[45] Mar. 21, 1972

[54] ELECTRONIC SWITCH ARRANGEMENTS

[72] Inventor: Walter H. Vogelsberg, Carversville, Pa.

[73] Assignee: The Black and Decker Manufacturing Company, Towson, Md.

[22] Filed: Sept. 26, 1969

[21] Appl. No.: 861,233

[52] U.S. Cl. ....................318/446, 200/DIG. 1

[51] Int. Cl. ....................H01h 3/14

[58] Field of Search....................307/113, 115; 200/52; 187/29; 318/446; 340/258

[56] References Cited

UNITED STATES PATENTS

| | | | |
|---|---|---|---|
| 3,320,437 | 5/1967 | Myers | 200/52 UX |
| 3,254,313 | 5/1966 | Atkins et al. | 200/52 UX |
| 2,525,768 | 10/1950 | Bruns | 200/52 UX |
| 3,525,028 | 8/1970 | Ruoss et al. | 318/446 |

*Primary Examiner*—Bernard A. Gilheany
*Assistant Examiner*—W. E. Duncanson, Jr.
*Attorney*—Arnold, Roylance, Kruger and Durkee

[57] ABSTRACT

This disclosure relates to electronic switches in which touch elements, separate from each other, must be touched to actuate the electronic switch to operate a load. In a first embodiment, the electronic switch energizes a load when the operator brings his finger near or touches a first touch element, and the electronic circuit deenergizes the load when the operator's finger is removed from the first touch element. A second touch element latches the electronic switch on when the operator touches or brings his finger close to the second touch element. Unlatching is then accomplished by momentarily touching the first touch element. In a second embodiment, the circuit is of the "AND" type and the operator must touch two touch elements continuously to maintain the electronic switch on and the load energized. In a third embodiment, two touch elements must be touched simultaneously to initially energize the load and thereafter the operator need only maintain his touch on or near one of the touch elements to maintain the load energized. In all the embodiments, the electronic switch is of the solid state type and is packaged in a small size electronic module capable of being mounted within the handle or casing of tools or appliances such as a portable electric drill, a router, or a grinder. In each embodiment, two SCR's each controlled by its respective touch element, cooperate to trigger a triac on for full wave conduction, or for half wave conduction, if desired.

40 Claims, 9 Drawing Figures

INVENTOR
WALTER H. VOGELSBERG
BY Arnold, Roylance, Kruger and Durkee ATTORNEY'S

INVENTOR

WALTER H. VOGELSBERG

BY Arnold, Roylance, Kruger and Durkee ATTORNEYS

INVENTOR

WALTER H. VOGELSBERG

BY Arnold, Roylance, Kruger and Durkee ATTORNEYS

ELECTRONIC SWITCH ARRANGEMENTS

This invention relates generally to electronic switch arrangements in which only a very small current is carried by a manually actuable switch or touch type circuit element to actuate the electronic switch.

More particularly, the invention relates to solid state proximity switch arrangements in which a touch button or plate requiring only a light touch is used to control the operation of a switch circuit.

Specifically, the invention relates to solid state proximity switch arrangements including several touch plates and in which each of the several touch plates are touched by an operator to control energization of a load connected to the proximity switch.

While there have been considerable developments recently in electronic and solid state controls for various devices, there has been little if any development relating to the improvement of mechanical switches or replacement of such switches by electronic circuitry to perform the same function. Because of the sensitivity of and small space requirements of solid state circuitry, the touch type or proximity switch has found increasing application in various industries. One exemplary use of touch type switches is in elevator service where the call buttons are frequently of the touch type. However, the circuitry used with existing elevator systems is quite complex and is hardly suitable as a replacement for the usual mechanical switch in various applications.

In the power tool and appliance field, touch type switches are quite advantageous for various reasons. One advantage of using a touch type switch with power tools is that the switch requires no pressure, but instead, merely a light touch, and hence, the operator of the tool experiences no fatigue from operating the switch or maintaining the tool ON for extended periods of time. In addition, where the prior mechanical switches were of the latching type, the latch button was frequently located in a rather awkward position for manipulation by the operator of the tool. With regard to appliances, such as the home type electric carving knife, difficulties and dangerous conditions were frequently experienced when the appliance was placed on an irregular surface and the switch was accidentally turned ON from the weight of the knife.

While a touch plate which turns a switch on when it is touched is indeed a convenience, such a switch could present a hazard if the switch latches in the ON condition, i.e., remains ON when the touch plate is no longer touched. Since the touch plate must be located at a convenient location for touching by the operator, a touch plate which when touched causes the solid state switch to latch ON may present a safety hazard since a conveniently located touch plate could be accidentally touched with the result that the tool is turned ON and remains ON.

In accordance with one embodiment of applicant's invention, there is a first touch plate which advantageously is used with a tool, such as an electric drill, and this first touch plate is located in the usual position of the mechanical trigger switch for the drill. However, the circuitry associated with the touch plate requires that the operator maintain his finger on the first touch plate to maintain the tool energized. In addition, there is also a second touch plate or latch plate, which when touched, turns the tool on, and the tool remains on even when the operator's finger is removed from the latch plate. The latch plate is so located on the tool that it cannot be accidentally touched to latch the tool in an ON condition. The circuit arrangement of this embodiment is such that touching the first touch plate unlatches the switch circuit and the tool then turns OFF when the first plate is released.

A second embodiment of the solid state switch of this invention also includes two touch plates, but in this embodiment both of the plates must be touched continuously to maintain the tool energized. Here, the tool may take the form of, for example, a router which requires the presence of both hands of the operator at particular locations on the tool to operate the tool safely. The touch plates are located at convenient locations on the tool for touching by a finger of each properly positioned hand of the operator. By virtue of the location of the touch plates, the tool can only be energized when the operator properly grips the tool with both hands.

A third embodiment of the solid state switch of this invention embodies a touch-grip concept. Here, the two touch plates are so located that the operator of the tool can conveniently touch both plates when the tool is properly held. The solid state circuitry is such that the tool cannot be energized initially unless both plates are touched at the same time. Then, after the tool is energized the operator must continue his touch or grip on one of the plates to maintain the tool energized, but can remove his finger from the other plate. Hence, the operator can change the position of his hand somewhat to lessen fatigue without de-energizing the tool.

In all embodiments of this invention, a first controllable bidirectional device having a control terminal, for example, a triac, is connected in series with a load, a second controllable conduction device, for example, an SCR, is connected to the control terminal of the triac to control triggering of the triac, and a third controllable conduction device, for example, another SCR, is also connected to the control terminal of the triac to control triggering of the triac. Each of the SCRs is controlled by a different touch plate to activate the electronic switch to the desired control condition. By using separate controlled conduction devices to trigger the triac, a touch control switch circuit arrangement is provided which is independent of such external conditions as humidity and temperature, within the working limits of the circuit elements of the switch.

In the several embodiments, the touch button or touch plate assembly is advantageously of laminated construction having a first conductive plate of metal such as copper separated from a second plate of conductive material of excellent durability and wear resistance, such as stainless steel, by a dielectric material which assures the complete absence of any electrical connection between the two plates. Depending on the embodiment of the invention, it is merely necessary for the operator to touch either or both of the rugged durable touch plates which, while functioning as extremely low current carrying switches, have no moving parts. Hence, loads of various types, such as power tools and appliances provided with the improved switch arrangements of this invention will have long life switch operation compatible with the life of the load.

Because of the small size packages required for solid state components, the proximity switch circuitry of the various embodiments of this invention can be readily mounted within the handle or elsewhere in the housing of the tool or appliance.

Correspondingly, an object of this invention is a unique proximity switch arrangement, including several touch plates, to control ON-OFF operation of a load.

Another object is a proximity switch including a touch plate and electronic circuitry with an expected life far in excess of the expected life of presently available mechanical switches for similar use.

Another object is a proximity switch for an electrical load, the switch including a first touch plate which causes the switch to energize the load whenever it is touched, but de-energizes the load when the plate is no longer touched, and which includes a second or latch plate which latches the switch ON, and correspondingly maintains the load in an ON condition.

A further object is a proximity switch in which a touch on one touch plate latches the switch in an ON condition, and a touch on another touch plate is effective to unlatch the switch.

A further object is a proximity switch arrangement in which two touch plates must be touched at the same time to initially energize a tool, but after the tool is energized, a continued touch on only one of the plates is sufficient to maintain the tool energized.

A further object is a safety type proximity switch arrangement in which two touch plates must be touched continuously to maintain a load energized.

A further object is a proximity switch arrangement in which two touch plates must be touched continuously to maintain a load energized, the touch plates being so spaced and located relative to each other that an operator must position his hands in a safe operating position on a load, such as a power tool, in order to touch both plates.

A further object is a proximity switch arrangement in several forms, which includes a "dead man" safety feature in that release of the grip or touch of the operator from one or both of the touch plates causes de-energization of the tool.

A further object of the invention is a proximity switch including multiple touch plates and controllable conduction devices, one controlled by each touch plate, the controllable conduction devices controlling in turn an additional controllable conduction device in series with the load.

An additional object is a proximity switch capable of various control functions, the switch including solid state components arranged within the handle or elsewhere in the housing of a power tool or appliance, and including no moving parts subject to mechanical failure.

Another and further object is a proximity switch arrangement which includes recessed touch plates so arranged and located on a tool or appliance that accidental touching of the plates to energize the tool is quite unlikely.

Another and further object is a unique touch plate assembly which is completely insulated from the casing of the tool or appliance with which the plate assembly is used, whereby there is virtually no chance that the operator of the tool can be injured in the event of a malfunction or breakdown of the tool insulation.

Numerous other objects, features, and advantages of this invention will become apparent with reference to the accompanying drawings which form a part of this specification and in which.

Figure 2:
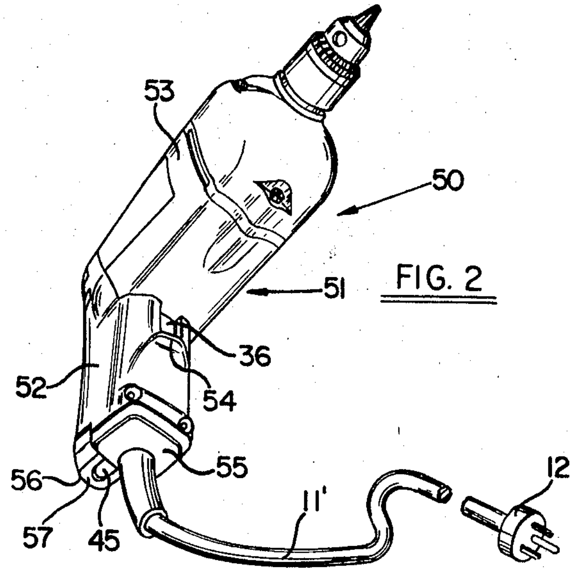
FIG. 2 is a pictorial view of a portable electric drill showing the location of the touch plates of the circuit of FIG. 1.
Figure 1:
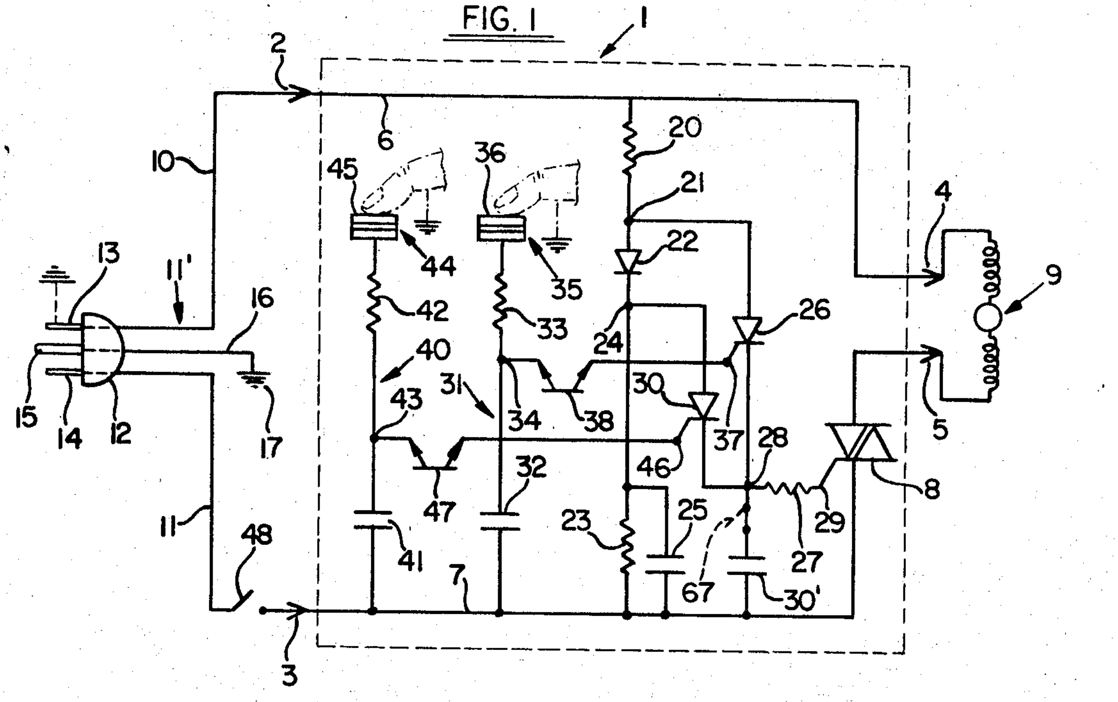
FIG. 1 shows a schematic of the circuit of a first embodiment of this invention.

Referring now to the drawings in detail, and particularly to FIGS. 1 and 2, there is shown a first embodiment of an electronic proximity type switch in accordance with this invention. Electronic switch 1 includes input terminals 2 and 3 and output terminals 4 and 5. Input terminal 2 is connected directly to output terminal 4 via line 6. Input terminal 3 is connected to a line 7 which is connected to one of the anodes of a triac 8, and output terminal 5 is connected to the other anode of triac 8. Output terminals 4 and 5 are connected respectively to the input terminals of a universal series motor 9 having an armature and field windings. Advantageously, motor 9 is the motor of the portable electric drill of FIG. 2.

Input terminals 2 and 3 are connected respectively to wires 10 and 11 of a line cord 11′ extending from a polarized plug 12. Polarized plug 12 has the usual blade prongs 13 and 14 and the usual cylindrical ground prong 15. Prong 15 is connected to a third or ground wire 16 of line cord 11′ and is grounded as at 17 to the casing of the tool or appliance in which circuit 1 is mounted. Wire 11 is connected to prong 14, and wire 10 is connected to prong 13. By virtue of the polarization of plug 12, prong 14 can only be connected to the "hot" wire of the 120-volt, 60-cycle AC power supply (not shown) and prong 13 can only be connected to the neutral wire of the power supply. Hence, it is assured that line 7 of circuit 1 will always be connected to the "hot" wire of the power supply and line 6 will always be connected to the neutral or grounded wire of the power supply when plug 12 is inserted in a mating electrical receptacle.

Connected between lines 6 and 7 of circuit 1 is a series circuit including a resistor 20 connected between line 6 and anode 21 of a diode 22, and a resistor 23 connected between the cathode 24 of diode 22, and line 7. In shunt across resistor 23 is a capacitor 25. Connected to anode 21 of rectifier 22 is the anode of an SCR 26. The cathode of SCR 26 is connected to one side of a current limiting resistor 27 a junction 28, and the other side of resistor 27 is connected to gate terminal 29 of triac 8. An SCR 30 has its anode connected to cathode 24 of rectifier 22 and its cathode connected to junction 28. Connected between junction 28 and line 7 is a capacitor 30′.

Connected to line 7 is a first capacitive voltage divider network 31 which includes a capacitor 32 having one end connected to line 7 and its other end connected to a resistor 33 at a junction 34. A touch button or touch plate assembly 35 is connected to the other end of resistor 33 so that capacitor 32, resistor 33, and touch button 35 are in series. Touch plate assembly 35 has an exposed touch plate 36 disposed to be touched by the finger or hand of the operator of the tool or appliance with which circuit 1 is used. The details of the touch plate assembly will subsequently be described in detail. Connected between junction 34 and gate 37 of SCR 26 is a trigger diac 38.

A second capacitive voltage divider network 40 is also connected to line 7. Circuit 40 includes a capacitor 41 connected to a resistor 42 at a junction 43. A touch plate assembly 44, having an exposed touch plate 45, is connected to the side of resistor 42 opposite junction 43. The arrangement of circuit 40 is such that touch plate assembly 44, resistor 42, and capacitor 41 are in series. Connected between junction 43 and gate 46 of SCR 30 is a trigger diac 47.

With reference to FIG. 2, there is shown a portable electric drill 50 having a housing or casing 51 including a handle 52 and a body portion 53 in which motor 9 is mounted. Circuit 1 is packed as an electronic module and is mounted within handle 52 of drill 50. The line cord 11′, with polarized plug 12 at its outer end, extends into the handle and is connected to circuit 1 in the manner described with reference to FIG. 1. Touch plate 36 is located on handle 52 at the position of the usual trigger switch for an electric drill, where it can conveniently be engaged by the index finger of the user of the drill. Advantageously, the portion 54 of the handle, adjacent touch plate 36, is of non-electrically conducting material. Touch plate assembly 35, of which touch plate 36 is a part, is located in an opening in portion 54 of the handle with touch plate 36 exposed but spaced inwardly of the end of the opening. With touch plate 36 so recessed, accidental engagement of the touch plate by the operator is prevented.

Touch plate assembly 44 is located at the bottom end 55 of handle 52, with touch plate 45 exposed. As shown at FIG. 2, touch plate 45 is offset toward the rear edge 56 of the handle and is recessed so it lies slightly inwardly of the end surface 57 of the non-electrically conducting material of the handle which surrounds it. Hence, accidental touching of touch plate 45 is also prevented. A safety ON-OFF mechanical switch 48 may be connected in line 7 to assure that the tool is not accidentally energized by touching one of the touch plates.

As will subsequently be described in detail, when plug 12 is inserted in a mating receptacle of a 120 volt 60 cycle power supply, and the finger of the operator touches touch plate 36, motor 9 or drill 50 becomes energized. When the operator removes his finger from touch plate 36, the motor is de-energized. If the operator desires to maintain the drill ON without maintaining his index finger on touch plate 36, it is merely necessary for the operator to momentarily touch touch plate 45 (which can readily be accomplished with the little finger of the hand gripping handle 52) whereupon circuit 1 latches ON and remains on even when the operator's finger is removed from touch plate 45. To deenergize the motor when circuit 1 is latched ON, it is merely necessary for the operator to momentarily touch touch plate 36, whereupon circuit 1 is unlatched and the motor becomes de-energized when the operator's finger is removed from touch plate 36.

Figure 3:
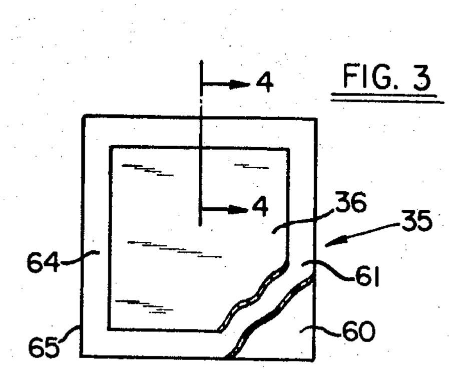
FIG. 3 is an enlarged plan view of a touch plate assembly used with the various circuits of this invention, with portions cut away for purposes of illustration.
Figure 4:
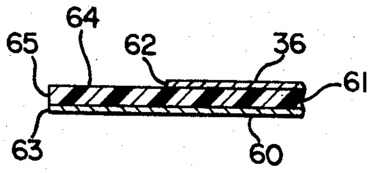
FIG. 4 is an enlarged partial view in section taken along line 4—4 of FIG. 3.

FIGS. 3 and 4 show the details of touch plate assembly 35. As shown, touch plate 36 is generally rectangular and is formed from a durable, attractive, conductive metal, such as stainless steel. Touch plate assembly 35 also includes a metal plate 60 formed from copper or other metal of good electrically conducting properties, plate 60 having a generally rectangular outline and being slightly larger than plate 36. Disposed between plates 36 and 60 is a layer of dielectric material 61 of substantially uniform thickness that completely cover plate 60. As shown at FIG. 4 plate 36, insulating material 61, and plate 60 are bonded together to form a laminated structure. By constructing touch plate assembly 35 so plate 36 is somewhat smaller than plate 60 and the insulating material 61, the likelihood of current leakage from, for example, a side edge 62 of plate 36 to side edge 63 of plate 60 is virtually eliminated by the relatively long length of the path along the surface 64 and edge 65 of insulating material 61. Since touch plate assembly 35 includes two parallel conductive plates separated by a dielectric material, assembly 35 functions electrically as a capacitor.

OPERATION OF THE EMBODIMENT FIGS. 1 AND 2

When plug 12 is plugged into a mating power supply receptacle, and switch 48 is closed, electronic switch 1 can be operated to energize motor 9 merely by touching either touch plate 36 or touch plate 45. Touching touch plate 36 operates circuit 1 to maintain motor 9 energized only as long as the operator maintains his touch on this touch plate.

Before explaining the operation of circuit 1 when touch plate 36 is touched, the characteristics of controllable conduction devices, such as the SCR and the triac will be briefly reviewed. The triac is a bidirectional controllable conduction device which can conduct current in either direction. When connected to control 60-cycle AC current, a trigger signal at the gate is required to initiate conduction during each half cycle of the current. As soon as conduction is initiated during each half cycle, the gate loses control and the triac continues to conduct for that half cycle. At the end of each half cycle the AC current passes through zero and the triac is commutated because the current through the triac falls below its holding current. Hence, to obtain full wave conduction through triac 8, a gate trigger signal must be applied to gate 29 early during each half cycle so the triac will conduct for a substantial portion of each half cycle.

The SCR is a unidirectional conducting device which will conduct current only in one direction. When the anode of an SCR is positive relative to its cathode, the SCR will conduct current if trigger signal is applied to its gate. If the SCR is reversed biased so that its cathode is positive relative to an anode, the SCR becomes non-conducting and will not again conduct until it is forward biased and a trigger signal is again applied to its gate. Hence, SCR 26 can conduct only when its anode is positive relative to its cathode and a trigger signal is applied to gate 37, and this occurs only during positive half cycles at line 6.

With these characteristics of a triac and SCR in mind, the operation of circuit 1 when touch plate 36 is touched will now be explained. As previously explained, touch plate assembly 35, resistor 33, and capacitor 32 form a capacitive voltage divider which is normally open circuited at the touch plate end. Since the human body has capacitance, the effect of touching touch plate 36 is to complete a circuit from touch plate 36 to the neutral or grounded line 6 via the human body as a capacitor, and ground. Hence, when the operator's finger touches touch plate 36 a circuit is completed across lines 6 and 7 of circuit 1. With the circuit so completed, capacitor 32 charges until the voltage at junction 34 exceeds the breakover voltage of diac 38. When diac 38 breaks over and conducts, a trigger signal appears at gate 37 of SCR 26 and the SCR is rendered conducting during half cycles of the AC current when line 6 is positive. If the operator's finger initially touches touch plate 36 during the half cycle when line 6 is negative relative to line 7, SCR 26 will not conduct because it is reverse biased. However, during the next half cycle, which is positive, the SCR will be forward biased and the trigger signal at gate 37 when diac 38 breaks over (operator's finger still engaging touch plate 36) triggers the SCR into conduction. When SCR 26 conducts, a positive trigger signal is applied to gate 29 of the triac via the series circuit of resistor 20, SCR 26, and resistor 27. Hence, triac 8 is rendered conducting and conducts for the remainder of the half cycle. Were it not for the current storing effect of capacitor 30', triac 8 would be triggered on only during the positive half cycles at line 6 when SCR 26 conducts. However, SCR 26, in addition to applying a positive trigger signal to gate 29 of the triac also charges capacitor 30' each time the SCR conducts. Then, during the following half cycle when line 6 is negative, capacitor 30' discharges through gate 29 of the triac and triggers the triac into conduction.

The components of the capacitive voltage divider network 31 are so selected that a trigger signal is provided at gate 37 of SCR 26 very early during each half cycle of the AC current when line 6 is positive and correspondingly, triac 8 is rendered conducting sufficiently early that substantially full line voltage and current is available to drive motor 9 during each positive half cycle. Since capacitor 30' begins to discharge through the triac gate as soon as SCR 26 is commutated, the triac is triggered on at substantially the beginning of each half cycle when line 6 is negative.

When the operator of the tool removes his finger from touch plate 36, triac 8 become non-conducting within one cycle of the alternating current supply. With the operator's finger removed from touch plate 36, there is no voltage buildup at junction 34 and hence, SCR 26 is not gated ON during the next half cycle when line 6 is positive. Hence, no signal is conducted by SCR 26 to the gate 29 of triac 8. If the operator removes his finger from touch plate 36 at an instant immediately after SCR 26 is triggered, the SCR is already conducting and gate 27 loses control. Hence, a trigger signal through the SCR will appear at gate 29 of the triac and the triac will be triggered on for that half cycle. During the next half cycle which is negative, the charge on capacitor 30' will again trigger the triac ON and the triac will conduct for this half cycle even though the operator's finger is removed from touch plate 36. However, during the next half cycle when line 6 is positive, SCR 26 will not be triggered because the operator's finger is no longer on touch plate 36 and hence, there is insufficient voltage at junction 34 to cause diac 38 to breakover and supply the trigger signal. Hence, when touch plate 36 is touched, triac 8 is triggered ON and motor 9 is energized so long as the operator's finger touches the touch plate. When the operator removes his finger from touch plate 36, the triac becomes non-conducting within one cycle of alternating current and the motor becomes de-energized.

If capacitor 30' is eliminated, triac 8 will conduct only during half cycles of the alternating current when line 6 is positive relative to line 7. This occurs because SCR 26 is reversed biased and cannot conduct when line 6 is negative to line 7. Hence, if capacitor 30' is eliminated, there is no current source to supply a trigger signal to gate 29 of the triac during the half cycles when line 6 is negative. As shown at FIG. 1, a switch 67 may be provided in series with capacitor 30' to permit switching capacitor 30' out of or into the circuit to provide for selective half wave and full wave conduction of the triac. Hence, switch 67 will provide for high-low speed control for motor 9.

Now consider the operation of circuit 1 when the operator touches touch plate 45. Touch plate 45 may aptly be termed a "latch plate" because touching the plate 45 latches circuit 1 in an ON condition and the circuit remain ON or conducting even after the operator removes his finger from touch plate 45. When touch plate 45 is touched, body capacitance completes the circuit of voltage divider network 40 across lines 6 and 7. During the first positive half cycle at line 6 after plate 45 is touched, capacitor 41 charges and diac 47 breaks over and applies a positive trigger pulse to gate 46 of SCR 30. Since the SCR is forward biased when line 6 is positive, SCR 30 conducts and triggers triac 8 via the series circuit of resistor 20, diode 22, SCR 30, and resistor 27. During the same half cycle capacitor 25 is charged through diode 22 so its upper plate is positive. Then, during the next half cycle when line 6 is negative, diode 22 blocks and capacitor 25 discharges through SCR 30 to maintain the SCR conducting. Since SCR 30 is still conducting at the start of the next positive half cycle at line 6, the SCR continues to conduct during this positive half cycle and capacitor 25 is again charged to maintain the SCR conducting during the next (negative) half cycle. Hence, gate 46 loses control after the first half cycle when SCR 30 conducts, and a continuous gate signal is supplied to triac 8, to maintain the triac conducting during each half cycle of the line current, even though the operator no longer touches plate 45. Therefore, the operator need only touch plate 45 momentarily to latch circuit 1 ON.

To unlatch circuit 1 it is merely necessary for the operator to momentarily touch touch plate 36. When touch plate 36 is touched, a trigger signal appears at gate 37 of SCR 26, and SCR 26 is thereby gated ON during the next positive half cycle of line 6 after touch plate 36 is touched. With reference to FIG. 1, it will be noted that SCR 26 is in shunt across the serially connected diode 22 and SCR 30. When SCR 26 conducts, there is only a very small potential difference between junction 21 and junction 28, and because of the higher voltage drop across the serially connected diode 22 and SCR 30, the potential at junction 24 is the same as the potential at junction 28 and hence, SCR 30 is commutated. With SCR 30 OFF, SCR 26 controls gate trigger signals to triac 8. Hence, when the operator's finger is removed from touch plate 36, no trigger signal is provided at gate 37, and the triac will commutate within one cycle of the supply current.

EMBODIMENT OF FIGS. 5 AND 6

Figure 5:
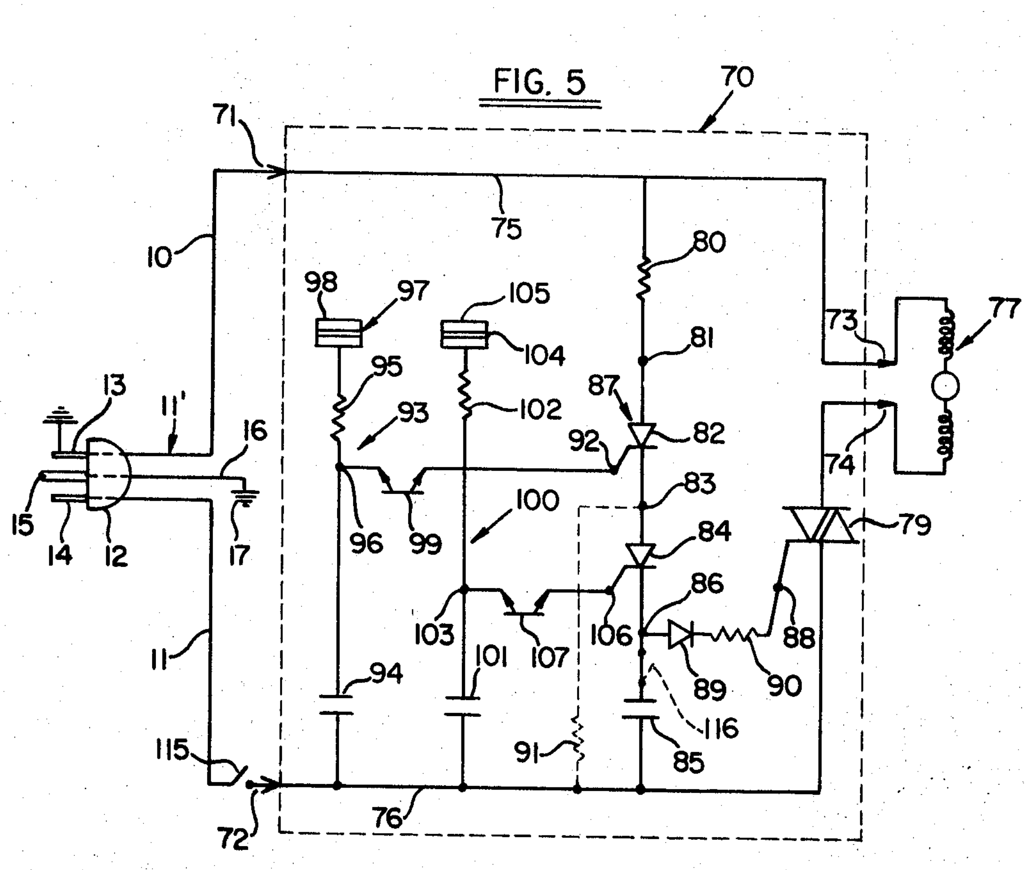
FIG. 5 is a schematic showing a second embodiment of circuitry according to this invention.

With reference to FIG. 5, there is shown an electronic switch circuit 70 in accordance with a second embodiment of this invention. Circuit 70 includes input terminals 71 and 72 connected respectively to output terminal 73 and 74 by lines 75 and 76. Connected to input terminal 71 is the neutral wire 10 of a line cord 11′ and connected to input terminal 72 is the "hot" wire 11 of the line cord 11′ of FIG. 1, and connected to the end of the line cord is a polarized plug 12 with blade prongs 13 and 14 and ground prong 15. The plug is so polarized that prong 13 is always connected to the neutral or grounded conductor of the power supply and prong 14 is always connected to the "hot" wire when plug 12 is inserted in a mating receptacle of the power supply. Conductor 16 is connected to ground prong 15 and is grounded to the casing of the tool as at 17, in the usual manner.

Figure 6:
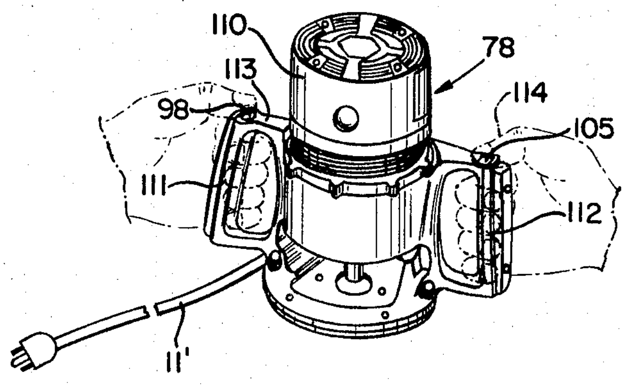
FIG. 6 is a pictorial view of a router showing the location of the touch plates of the circuit of FIG. 5.

Motor 77, which in this case is the motor of the router 78 of FIG. 6, is connected across the output terminals 73, 74 of circuit 70. The motor 77 is a universal series motor with the usual field and armature windings. A triac 79 is connected between input terminal 72 and output terminal 74 so it is in series with motor 77.

The gate control circuit for triac 79 includes a resistor 80 connected from line 75 to the anode of SCR 82 at junction 81. The cathode of SCR 82 is connected to the anode of SCR 84 at junction 83, and the cathode of SCR 84 is connected to capacitor 85 at junction 86. The gate control circuit 87 comprised of these serially connected components is connected across lines 75 and 76 with resistor 80 connected to line 75 and capacitor 85 connected to line 76. Connected between junction 86 and gate terminal 88 of the triac is a diode 89 in series with a resistor 90. The anode of diode 89 is connected to the junction 86.

Connected to gate terminal 92 of SCR 82 is a first gate control circuit 93. Gate control circuit 93 includes a capacitor 94, having one end connected to line 76 and its other end connected to a resistor 95 at junction 96. A touch plate assembly 97, including an exposed touch plate 98, is connected to resistor 95 so the touch plate assembly is in series with resistor 95 and capacitor 94. Connected between junction 96 and gate terminal 92 of SCR 82 is a diac 99.

SCR 84 is controlled by gate control circuit 100. Gate control circuit 100 includes a capacitor 101 connected in series with a resistor 102 at junction 103. A touch plate assembly 104, having an exposed touch plate 105, is connected to the resistor so the touch plate assembly 104 is in series with resistor 102 and capacitor 101. Connected between junction 103 and gate terminal 106 of SCR 84 is a diac 107.

Touch plate assembly 97, resistor 95, and capacitor 94 form a capacitive voltage divider which operates in the manner previously explained for the capacitive voltage divider circuits 31 and 40 of the embodiment of FIG. 1. Touch plate assembly 104, resistor 102, and capacitor 101 forms a similar capacitive voltage divider.

As will soon be described in detail, circuit 70 operates to energize motor 77 only when both touch plate 98 and touch plate 105 are touched continuously. If the operator's finger is removed from either touch plate, the circuit becomes nonconducting and motor 77 is de-energized.

Circuit 70 may advantageously be used to control the motor of router 78 of FIG. 6. Since circuit 70 includes solid state control elements, it is packaged in a small electronic module (not shown) which is mounted within casing 110 of router 78. Line cord 11′ extends into the casing and is connected to circuit 70 in the manner previously described with reference to FIG. 5.

As shown at FIG. 6, handles 111 and 112 extend respectively from opposite sides of casing 110 of the router. Mounted in the top of handle 111 is touch plate assembly 97 with touch plate 98 exposed but recessed below the upper surface 113 of the handle. Similarly, touch plate assembly 104 is mounted in an opening at the top of handle 112, with touch plate 105 exposed but slightly below the upper surface 114 of the handle. Touch plate assemblies 97 and 104 have a structure like that of touch plate assembly 35 previously described with reference to FIGS. 3 and 4. The touch plate assemblies are insulated from the handles with a suitable dielectric material, and leads extend from the touch plate assemblies to the packaged switch module within the router casing.

It will be observed with reference to FIG. 6 that the operator of router 78 can grasp handle 111 with the fingers of his left hand and handle 112 with the fingers of his right hand. The motor of the router can then be conveniently energized by maintaining a touch on touch plate 98 with the thumb of the left hand of the operator and maintaining a touch on touch plate 105 with the thumb of the right hand of the operator. By so locating touch plates 98 and 105 that the operator must properly position and maintain both hands on the handles in order to energize the router, touch plates 98 and 105 perform a safety function which prevents the operator from trying to manipulate the router with only one hand.

The location of touch plates 98 and 105 is exemplary, and it is to be understood that the respective touch plates could be located on the sides of handles 111 and 112 at a location for convenient engagement by, for example, the index fingers of the operaor's hands.

OPERATION OF THE EMBODIMENT OF FIGS. 5 AND 6

When plug 12 is inserted in a mating electrical receptacle and switch 115 is closed, circuit 70 can be operated to energize motor 77 but only when touch plates 98 and 105 are touched continuously. When touch plates 98 and 105 are touched continuously, electronic switch 70 operates as follows. First consider the operation of gate control circuit 93 which controls SCR 82. When touch plate 98 is touched, capacitor 94 charges in the manner previously explained with regard to the embodiment of FIG. 1. When the voltage across capacitor 94 reaches the breakover value of diac 99, the diac conducts and applies a trigger signal to gate 92 of SCR 82.

This transmits a voltage to the anode of SCR 84, while leaving SCR 82 in a triggered condition.

At substantially the same time, the touch plate 105 is touched and a charge builds up on capacitor 101. When the voltage reaches the breakover value of diac 107, a trigger signal appears at gate 106 of SCR 84. Thus upon the arrival of the voltage through SCR 82, SCR 84 is turned on and both are latched into conduction for the remainder of the positive half cycle of voltage. When both SCR 82 and SCR 84 are conducting during a particular half cycle when line 75 is positive, a positive trigger signal is provided through resistor 80, SCR 82, SCR 84, diode 89, and resistor 90 to gate 88 of triac 79 and the triac conducts during the half cycle. Since the gate trigger signals for SCR 82 and SCR 84 occur very early during each half cycle, triac 79 is gated on during each half cycle when both SCR's conduct. During the positive half cycles when SCR 82 and SCR 84 conduct, the plate of capacitor 85 connected to junction 86 is charged positively, and when the SCRs turn OFF at the end of the positive half cycle, capacitor 85 discharges through diode 89 and resistor 90 to provide a gate signal at gate 88 of the triac during the next half cycle when line 75 is negative. Hence, triac 79 is gated on for full wave conduction by the action of SCR's 82 and 84, and capacitor 85. If it is desired to be able to control triac 79 for either full wave or half wave operation, so the speed of motor 77 can be selected at a high or low level, a switch 116 can be provided to selectively connect or disconnect capacitor 85.

While this circuit has been found to operate in the indicated manner, it is possible that the use of two SCRs in series can cause erratic operation if the anode-cathode voltages and trigger voltages do not sufficiently overlap. In this case, a resistor 91, shown in dotted lines in FIG. 5, may be provided to supply an appropriate voltage to junction 83 so that either SCR will turn on as soon as its trigger voltage arrives at the gate. Alternatively, it may be helpful in some cases to provide gate control circuit 93 with a smaller time constant than that of circuit 100 or to provide a lower breakover voltage diac at 99 than at 107.

If the operator maintains his touch on only one of the two touch plates, circuit 70 will not be rendered conducting to energize motor 77. If only touch plate 98 is touched, SCR 82 will be triggered into conduction during each half cycle when line 75 is positive, but no trigger signal will be available at gate 88 of the triac because SCR 84 receives no trigger pulse. If only touch plate 105 is touched, a trigger pulse will appear at gate 106 of SCR 84, but the SCR will not latch into conduction because SCR 82 is not conducting. Hence, the operator must maintain his touch on both touch plate 98 and touch plate 105 whereupon, the triac is triggered on by a trigger signal through the SCR's during half cycles when line 75 is positive, and is triggered on during half cycle when line 75 is negative by the charge stored on capacitor 85. If the operator removes his finger from one of the two touch plates, the SCR controlled by that plate no longer receives a gate pulse during each half cycle and correspondingly, a trigger pulse through the SCR's is no longer available during each positive half cycle to trigger the triac ON, and the charge on capacitor 85 is not replenished. Hence the triac commutates within one cycle of the supply current after the operator's touch is removed from either or both touch plates, and motor 77 is de-energized.

EMBODIMENT OF FIGS. 7–9

Electronic switch circuit 120 (FIG. 7) is somewhat similar to switch circuits 1 and 70, but operates in a slightly different manner. Circuit 120 has input terminals 121 and 122 connected respectively to output terminals 123 and 124 by the respective lines 125 and 126. A line cord 11', having a polarized plug 12, is so connected to input terminals 121 and 122 that line 126 is always connected to the "hot" line of the power supply and line 125 is always connected to the neutral or grounded line of the power supply when plug 12 is connected to the power source.

Figures 8, 9:
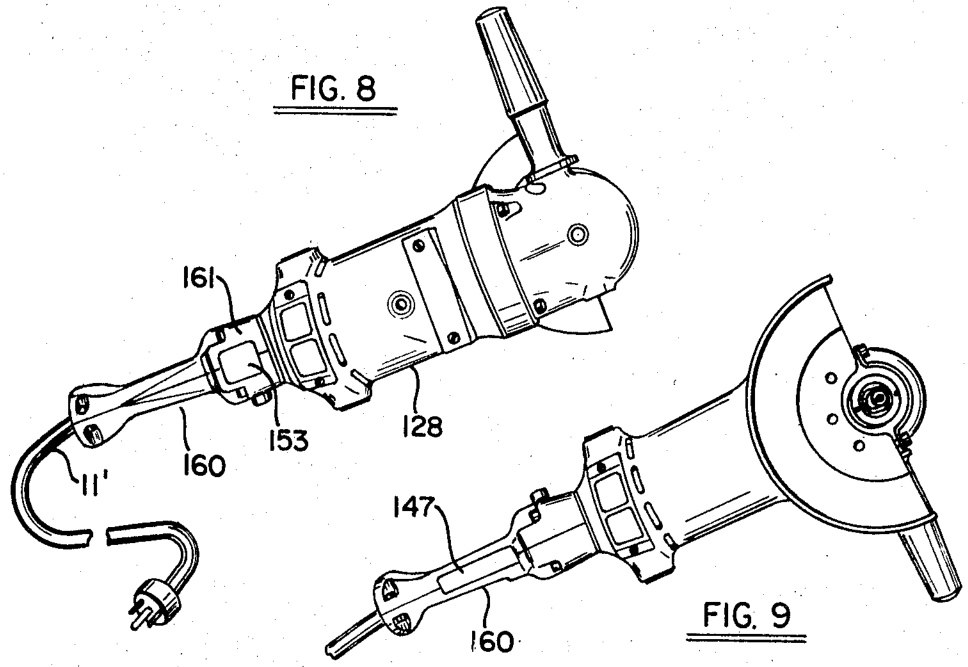
FIG. 8 is a top plan view of a heavy duty grinder showing the location of one of the touch plates of the circuit of FIG. 7.
FIG. 9 is a bottom plan view of the heavy duty grinder of FIG. 8 showing the location of the other touch plate of the circuit of FIG. 7.

A motor 127, which advantageously is the motor of the heavy duty grinder 128 of FIGS. 8 and 9, is connected across output terminals 123 and 124. A triac 128 is connected in series with motor 127 between input terminal 122 and output terminal 124.

The gate control circuit 130 for triac 128 is quite similar to gate control circuit 87 of the embodiment of FIG. 5. Connected from line 125 to line 126 is a series circuit including resistor 131, SCR 132, SCR 133, and capacitor 134. The resistor 131 is connected to the anode of SCR 132 at junction 135, the cathode OF SCR 132 is connected to the anode of SCR 133 at junction 136, and the cathode of SCR 133 is connected to capacitor 134 at junction 137. Extending from junction 137 is a resistor 138 which is connected to gate 139 of triac 128. Connected from junction 136 to line 126 is a capacitor 140, and a resistor 141 is connected in shunt across the capacitor.

The gate control circuit 142 for SCR 132 includes a capacitive voltage divider circuit connected to line 126 and comprised of a capacitor 143 connected to a resistor 144 at junction 145, and a touch plate assembly 146 with an exposed touch plate 147. A trigger diac (bilateral trigger diode) 148 is connected between junction 145 and gate 149 of SCR 132. Similarly, gate control circuit 151 for SCR 133 includes a touch plate assembly 152 with exposed touch plate 153, a resistor 154, and a capacitor 155 connected to resistor 154 at junction 156. A trigger diac 157 is connected between junction 156 and gate 158 of SCR 133.

Figure 7:
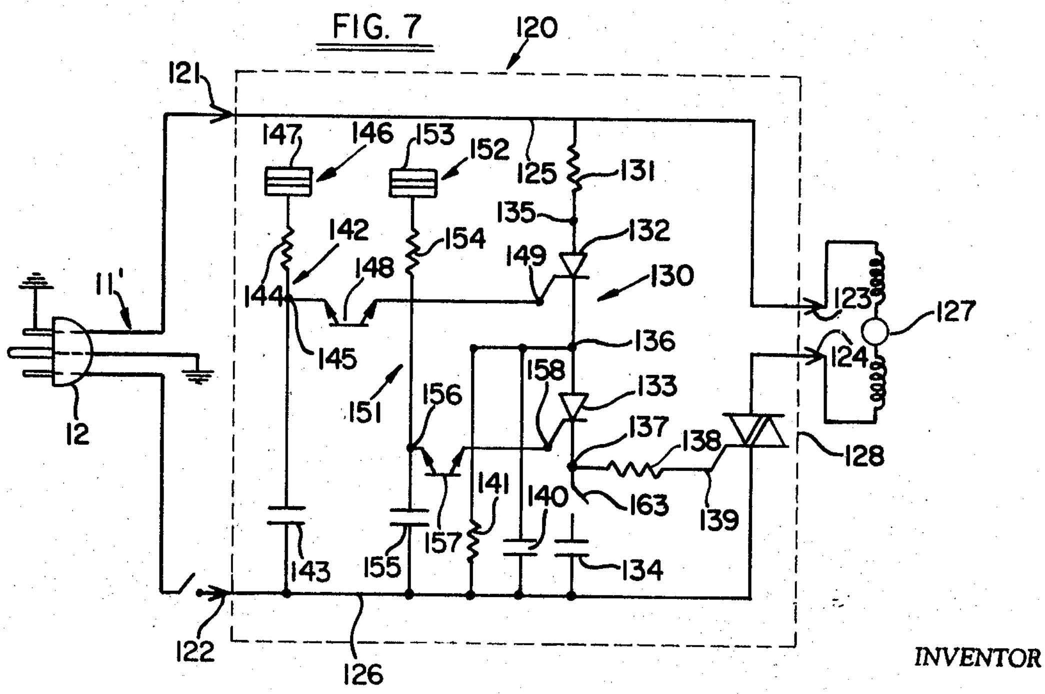
FIG. 7 is a schematic of the circuit of a third embodiment of this invention.

As is apparent by comparison of circuit 70 of FIG. 5 and circuit 120 of FIG. 7, these circuits are substantially identical except that circuit 120 includes a capacitor 140, and the values of certain components of the circuits are different.

Circuit 120 is assembled as an electronic module and is mounted within the handle 160 of grinder 128. Line cord 11' extends into the handle and is connected to the input terminals as previously described with reference to FIG. 7. Touch plate assembly 152 is mounted in an opening in the forward portion 161 of the grinder handle with touch plate 153 exposed at the top of the handle. Touch plate assembly 146 is mounted in the central portion of the handle with touch plate 147 exposed at the bottom of the handle. As shown at FIG. 9, touch plate 147 is narrow and elongated, and occupies a position on handle 160 where it can be conveniently engaged by the fingers of the hand of an operator gripping handle 160. Touch plate 153 is located on the opposite side of the handle from and slightly forwardly of touch plate 147 so that the plate is in a convenient position for engagement by the thumb of the operator's hand which grips handle 160. The arrangement of switch circuit 120 is such that the operator must touch both touch plate 153 and touch plate 160 to initially energize motor 127 but thereafter need only maintain a touch on touch plate 147 to maintain the motor energized. Since touch plate 147 is elongated, the operator can slide his hand along the handle or otherwise change the position of his hand on the handle to avoid fatigue during long periods of use, without deenergizing the tool so long as a continuous touch is maintained on touch plate 147. Touch plate assemblies 146 and 152 are of the same laminated construction as touch plate assembly 35 described with reference to FIGS. 3 and 4.

OPERATION OF THE EMBODIMENT FIGS. 7–9

To operate switch circuit 120 to energize motor 127 it is merely necessary to connect plug 12 to a power supply, close switch 122, grip or touch touch plate 147, and momentarily touch touch plate 153. Then, motor 127 remains energized merely by maintaining a touch on touch plate 147.

The operation is as follows. When touch plate 147 is touched, capacitor 143 charges and provides a gate pulse at gate 149 of SCR 132, and SCR 132 latches into conduction during positive half cycles of line 125. During each half cycle when SCR 132 conducts, capacitor 140 is charged so junction 136 is positive. Capacitor 140 is so selected that the charge on capacitor 140 is sufficient to forward bias SCR 133 for at least a time interval equal to slightly more than one-half cycle of the supply current. After SCR 132 has conducted for one positive half cycle, SCR 133 will be triggered into conduction during the next half cycle when line 125 is positive even though SCR 132 is not triggered ON until later in the same half cycle, because of the forward bias provided by the charge on capacitor 140. Hence, the sequence of arrival of a gate trigger pulse at the gates of SCR 132 and SCR 133 is not critical, save that these trigger pulses should arrive very early during each half cycle when line 125 is positive to provide for substantially full wave conduction of triac 128.

As soon as SCR 133 becomes conducting, the gate 158 loses control because capacitor 140 provides sufficient positive current through SCR 133 to maintain it conducting during negative half cycles when SCR 132 is non-conducting, as well as during the initial portion of each positive half cycle before SCR 132 latches into conduction. Hence, since gate 158 no longer has control, the operator can remove his touch from touch plate 153 and still maintain motor 127 energized by maintaining his touch on touch plate 147 only. Since the charge on capacitor 140 is replenished during each positive half cycle of line 125 when SCR 132 conducts, SCR 133 remains on continuously so long as the operator's touch is maintained on touch plate 147. As soon as the operator releases his touch from touch plate 147, SCR 132 is no longer triggered into conduction during each positive half cycle, and the charge on capacitor 140 dissipates in a time equal to perhaps several cycles of the AC supply current. SCR 133 ceases conducting when the current from capacitor 140 falls below the holding current for the SCR.

When both SCR 132 and SCR 133 conduct, a positive trigger signal is provided at gate 139 of the triac through resistor 131, SCR 132, SCR 133, and resistor 138, and capacitor 134 is charged so junction 137 is positive. During the negative half cycles at line 25, the capacitors 134 and 140 provide a trigger signal for the triac as they discharge through resistor 138 and gate 139. Alternatively, if capacitor 140 is sufficiently large, capacitor 134 can be eliminated.

While the term "touch plate" has been used with reference to the plates 36, 45, 97, 104, 147, and 153, these plates may aptly have been termed "proximity plates," and while the term "touch" has been used with reference to the position of the operator's finger relative to the plates, it may only be necessary for the operator to bring his finger or hand into close proximity with a plate to complete the voltage divider circuit to the grounded line of the power supply.

While several preferred embodiments of the electronic switch circuits of this invention have been shown and described in detail, it is to be understood that numerous changes and modifications can be made in these embodiments without departing from the intended scope of this invention. For example, inexpensive, low current carrying switches of a mechanical type may be used to control the gate circuit of the control SCR's, in lieu of the proximity type touch plate arrangement disclosed herein. In addition, other touch type elements may be used in lieu of the touch plate and touch plate assemblies disclosed herein without departing from the intended scope of this invention. It is also to be understood that other types of controllable conduction devices may be used in lieu of the thyristors (SCR's and triacs) disclosed in the preferred embodiments described herein.

What is claimed is:

1. In combination with a load adapted to be energized from a source of current, a manually actuable control for controlling energization of the load, said control comprising:
first and second control elements for manual engagement by an operator;
first and second solid-state controllable conduction devices each having a control terminal;
circuit means connecting said control elements respectively to said control terminals of said controllable conduction devices and responsive to manual engagement of at least said first control element to deliver a voltage to the control terminal of at least said first controllable conduction device, thereby rendering said first device conductive;
control means responsive to the conduction of at least said first controllable conduction device to energize the load from the source of alternating current;
said control means being responsive to conduction of said second controllable conduction device to energize the load from the source of alternating current; and
said second control element, circuit means, and second controllable conduction device cooperating to provide means responsive to manual engagement of said second control element to render said second controllable conduction device conducting during at least a portion of each cycle of alternating current from the source, so long as the manual engagement on the second control element is maintained.

2. In combination with a load adapted to be energized from a source of current, a manually actuable control for controlling energization of the load, said control comprising:
first and second control elements for manual engagement by an operator;
first and second solid-state controllable conduction devices each having a control terminal;
circuit means connecting said control elements respectively to said control terminals of said controllable conduction devices and responsive to manual engagement of at least said first control element to deliver a voltage to the control terminal of at least said first controllable conduction device, thereby rendering said first device conductive;
control mean responsive to the conduction of at least said first controllable conduction device to energize the load from the source of alternating current; and
said control means being responsive to and requiring conduction of both said first and second controllable conduction devices to energize the load from the source of alternating current.

3. The combination of claim 2 wherein
said circuit means renders said first controllable conduction device conducting only when said first control element is manually engaged, and renders said second controllable conduction device conducting only when said second control element is manually engaged;
whereby, said control means energizes said load continuously only when said first and second control elements are continuously engaged manually.

4. The combination of claim 2 wherein
said circuit means renders said first controllable conduction device conducting when said first control element is manually engaged and renders said second controllable conduction device conducting when said second control element is manually engaged; and
means responsive to continued conduction of said first controllable conduction device to maintain said second controllable conduction device conducting after it is initially rendered conducting and manual engagement of said second control element is terminated.

5. A touch controlled circuit for energizing a load from a source of alternating current comprising
input terminals adapted to be connected to the alternating current source;
output terminals adapted to be connected to the load;
a solid-state switching device having a control electrode and connected between one input terminal and one output terminal;
conductor means connected between the other input terminal and the other output terminal;
first circuit means including a first controlled rectifier connected between said conductor means and said control electrode;
second circuit means including a second controlled rectifier connected across said first controlled rectifier;
first touch circuit means responsive to the operator's touch on a first touch element thereof to trigger said first controllable rectifier;
second touch circuit means responsive to the operator's touch on a second touch element thereof to trigger said second controlled rectifier;
whereby, a touch on either touch element triggers its respective SCR into conduction to provide a gating voltage at the control electrode to cause the switching device to conduct; and means to maintain said second controlled rectifier conducting after it is triggered initially by a momentary touch on said second touch element, whereby, said switching device is rendered conducting continuously.

6. A circuit according to claim 5 wherein a momentary touch on said first touch element is effective to render said first controlled rectifier conducting, and to render said second controlled rectifier non-conducting.

7. A circuit according to claim 5 wherein said means to maintain said second controlled rectifier conducting comprises a capacitor connected to one terminal of said second controlled rectifier and effective to maintain a holding current through said capacitor.

8. A circuit according to claim 7 wherein said capacitor is charged during positive half cycles of alternating current at said conductor means, through a diode connected between said conductor means and said capacitor.

9. A circuit according to claim 8 wherein said diode is in series with said second controlled rectifier and form part of said second circuit means.

10. A touch circuit according to claim 9 wherein said solid-state switching device is a bidirectional triode thyristor.

11. A touch circuit for energizing a load from a source of alternating current, comprising a full wave type of solid-state switching device connected in series with the load across the source, the switching deice having a control electrode;

first and second series-connected controlled rectifiers, each of which has a respective anode, cathode, and gate electrode, the anode of the first rectifier being connected to the grounded side of the source, the cathode of the first rectifier being connected to the anode of the second rectifier, and the cathode of the second rectifier being connected to the control electrode of the switching device;

a first touch plate and a second touch plate separate from one another;

means responsive to a manual touching of the first touch plate to deliver a gating voltage to the gate of the first rectifier, thereby firing the first rectifier;

means responsive to a manual touching of the second touch plate to deliver a gating voltage to the gate of the second rectifier, thereby firing the second rectifier;

whereby, the first and second rectifiers are in conduction, a gating voltage is provided for the control electrode of the switching device, and the switching device is rendered conducting to energize the load from the source as long as the operator maintains his contact with both touch plates.

12. A touch circuit according to claim 11 wherein said switching device is a triac, and said control electrode is the gate of the triac;

said controlled rectifiers can conduct a gating voltage to the triac from the grounded side of the source only when the grounded side is positive; and which further includes means to provide a gating signal at the gate of said triac during at least a portion of the half cycle when said grounded side is negative.

13. A touch circuit according to claim 12 wherein said means to provide a gating signal at the gate of said triac comprises a capacitor connected to the gate of said triac.

14. A touch circuit according to claim 11 wherein impedance means connects the cathode of said first controlled rectifier to the un-grounded other side of said source to provide a conduction path across said source, whereby, said first controlled rectifier is rendered conducting during each positive half cycle at said grounded side, whenever said first touch plate is manually touched; and said means responsive to manual touching of said first touch plate delivers a gating voltage pulse to the gate of said first controlled rectifier at a time, during each positive half cycle, slightly earlier than said means responsive to manual touching of said second touch plate delivers a gating voltage pulse to the gate of said second controlled rectifier;

whereby, during each positive half cycle when both touch plates are manually engaged, said first controlled rectifier is latched into conduction and provides the forward bias for the second controlled rectifier slightly before the second controlled rectifier receives its gate voltage pulse.

15. A touch circuit according to claim 11 wherein said means responsive to manual touching of said first touch plate comprises a voltage divider circuit including a series circuit of a capacitor and a resistor connected between the ungrounded side of the source and the first touch plate, with the capacitor connected to the ungrounded side, and a breakover device connected between the resistor-capacitor junction and the gate of said first controlled rectifier.

16. A touch circuit according to claim 15 wherein said means responsive to manual touching of said second touch plate comprises a voltage divider circuit including a series circuit of a capacitor and a resistor connected between the ungrounded side of the source and the second touch plate, with the capacitor connected to the ungrounded side, and a breakover device connected between the resistor-capacitor junction and the gate of said second controlled rectifier.

17. A touch and grip circuit for energizing a load from a source of alternating current comprising, a full-wave type of solid-state switching device connected in series with the load across the source, the switching device having a control electrode;

first and second series-connected controlled rectifiers, each of which has a respective anode, cathode, and gate electrode, the anode of the first rectifier being connected to one side of the current source, the cathode of the first rectifier being connected to the anode of the second rectifier, and the cathode of the second rectifier being connected to the control electrode of the switching device;

a first touch plate;

a second touch plate adapted to be gripped by the operator and separate from the first touch plate;

means responsive to a manual touching of the first touch plate to deliver a gating voltage to the gate of the first rectifier, thereby firing the first rectifier;

means responsive to a manual gripping of the second touch plate to deliver a gating voltage to the gate of the second rectifier, thereby firing the second rectifier;

whereby, the first and second rectifiers are in conduction and provide a gating voltage for the control electrode of the switching device and the switching device conducts to energize the load from the source; and a capacitor connected between the junction of the first and second rectifiers and the other side of the current source, said capacitor alternately charging on the positive half cycle of the alternating current source when said first rectifier conducts and discharging on the negative half cycle to maintain the second rectifier in conduction, thereby continuously energizing the load as long as the operator maintains his grip on at least the grip plate.

18. A circuit according to claim 17 wherein a resistor is connected across said capacitor to provide a conduction path for said first controlled rectifier from the grounded side to the other side of said source;

whereby, said first controlled rectifier latches into conduction during each positive half cycle of the source, when the operator grips the first touch plate, regardless of the state of conduction of said second controlled rectifier.

19. A circuit according to claim 18 wherein said solid-state switching device is a triac, and said control electrode is the triac gate.

20. A circuit according to claim 19 wherein a capacitor is connected between the cathode of said second controlled rectifier and the other side of the source, said capacitor providing means to provide a gating voltage at the triac gate to trigger said triac into conduction during negative half cycles at said grounded side;

whereby, said triac is triggered into conduction during each positive and negative half cycle so long as the operator maintains his grip on said second touch plate.

21. In a portable electric tool or appliance, the combination of a housing having handle means adapted to be grasped by the operator;

a load means within the housing for energization from a source of current;

switching means for controlling the energization of the load means from the source, the switching means having at least one control electrode;

first and second serially connected controllable conduction means connected to the control electrode of the switching means;

first touch plate means and separate second touch plate means provided on the handle means for convenient touch and grip, respectively, by the operator;

means responsive to a manual touch of the touch plate means for driving the first controllable conduction means into conduction;

means responsive to a manual grip of the second touch plate means for driving the second controllable conduction means into conduction;

whereby, the conduction of both controllable conduction means provides a voltage for the control electrode of the switching means, thereby allowing the switching means to energize the load means from the current source; and means for maintaining energization of the load means as long as the operator maintains his grip on at least the second touch plate means.

22. The combination of claim 21 wherein said load is a universal series motor; and said switching means is a solid-state controllable conduction device in series with said motor.

23. The combination of claim 21 wherein said source of current is a source providing at least positive half cycles across said serially connected controlled conduction means; and said means for maintaining energization of said load means comprises a current storing device connected to the control electrode of said switching means.

24. The combination of claim 21 wherein said first and second serially connected controllable conduction means are controlled rectifiers.

25. The combination of claim 24 wherein said source is an alternating current source, said switching means is in series with said load means across said source;

said controlled rectifiers each have an anode and cathode, and are serially connected with the anode of one connected to the cathode of the other, said serially connected rectifiers being connected across said control electrode and one side of said alternating current source.

26. The combination of claim 25 wherein said switching means is of the type requiring a trigger voltage at its control electrode during each positive and negative half cycle of the current source; and said controlled rectifiers are driven into conduction only during half cycles when said anodes are positive relative to said cathodes.

27. In a portable electric tool or appliance, the combination of a housing having handle means adapted to be grasped by the operator;

a motor within the housing for energization from a source of alternating current;

switching means for controlling the energization of the motor from the source, the switching means having at least one control electrode;

first and second serially connected controllable conduction means connected to the control electrode of the switching means;

a first touch means and a second touch means provided on the handle means for convenient manual engagement by the operator;

means responsive to a manual touch of the first touch means for driving the first controllable conduction means into conduction;

means responsive to a manual touch of the second touch means for driving the second controllable conduction means into conduction;

whereby, the conduction of both controllable conduction means provides a voltage for the control electrode of the switching means, thereby allowing the switching means to energize the motor from the source of alternating current for the tool.

28. The combination of claim 27 wherein the switching means is a thyristor; and said thyristor is in series with said motor.

29. The combination of claim 30 wherein said first controlled conduction means is a controlled rectifier having an anode and cathode;

said second controlled conduction device is a controlled rectifier having an anode and cathode;

the cathode of the first controlled rectifier is connected to the anode of the second controlled rectifier, whereby the controlled rectifiers are connected in series; and the series connected controlled rectifiers are connected between the control electrode and one side of the source of alternating current.

30. The combination of claim 29 wherein an impedance is connected between the cathode-anode connection of said controlled rectifiers and the other side of the source of alternating current;

whereby, the impedance and one of the controlled rectifiers are serially connected across the power source, and said one of the controlled rectifiers is driven into conduction when the respective touch plate is touched and the source voltage is of the proper polarity.

31. The combination of claim 30 wherein said switching means is a thyristor and said control electrode is gate electrode; and a capacitor is connected between said gate electrode and said other side of the alternating current source.

32. The combination of claim 27 wherein the portable electric tool is a tool such as a router and the handle means includes two handles;

said first touch means is mounted on one handle for convenient touch by the hand of an operator grasping the handle; and said second touch means is mounted on the other handle for convenient touch by the hand of the operator grasping that handle;

whereby, the operator must properly grasp both handles to energize the electric tool.

33. The combination according to claim 27 wherein the portable electric tool is a tool such as a grinder, and the handle means includes at least one elongated handle;

said first touch plate is mounted on one side of the handle for convenient touch by the thumb of the hand of the operator grasping the handle; and said second touch plate is elongated and is mounted on another side of the handle for convenient gripping by the fingers of the same hand;

said elongated second touch plate permitting the operator to slide his hand along the handle to comfortable positions while maintaining a touch on the second touch plate.

34. In combination with a portable electric tool or appliance having a hosing provided with a handle means adapted to be grasped by the operator, and electric motor in the housing adapted to be energized from a source of alternating current, a manual control means for controlling the energization of the motor, said control means comprising, first and second solid-state controllable conduction devices, each of which is provided with a control electrode;

first and second control elements arranged on the handle means, separate from one another, for manual engagement by the operator;

means responsive to the manual engagement of the first and second control elements for delivering a respective voltage to the control electrodes of the first and second solid-state controllable conduction devices, thereby rendering both of said devices conductive; and means responsive to the conduction of both of said devices for energizing the motor from the line.

35. The combination of claim 34 wherein the portable electric tool is a tool such as a router and the handle means includes two handles;

said first control element is mounted on one handle for convenient touch by one hand of an operator gripping one handle; and said second control means is mounted on the other handle for convenient touch by the other hand of the operator gripping the other handle;

whereby, the operator must properly grip both handles to energize the tool.

36. The combination of claim 35 wherein said means responsive to manual engagement of said first and second control elements requires continuous manual engagement of said elements to render said conduction devices conductive continuously, and to correspondingly energize said motor continuously.

37. The combination of claim 34 wherein the portable tool is a tool such as a portable grinder, and the handle means includes an elongated handle;

said first control element is mounted on one side of the handle for convenient engagement by the thumb of the hand of the operator grasping the handle; and said second control element is elongated and is mounted on another side of the handle for convenient engagement by the fingers of the hand grasping the handle;

said elongated second control element permitting the operator to slide his hand along the handle while maintaining engagement with the second control element.

38. The combination of claim 37 wherein said control means further includes means to render said conduction device conductive continuously after both conduction devices are conducting, so long as manual engagement on said second control element is maintained, regardless of whether or not manual engagement on said first control element is maintained.

39. In combination with a portable electric tool or appliance having a housing provided with a handle means adapted to be grasped by the operator, and electric motor in the housing adapted to be energized from a source of alternating current, a manual control means for controlling the energization of the motor, said control means comprising, first and second solid-state controllable conduction devices, each of which is provided with a control electrode;

first and second control elements arranged on the handle means, separate from one another, for manual engagement by the operator;

means responsive to the manual engagement of the first control element to deliver a trigger voltage to the first conduction device to render it conducting;

means responsive to the manual engagement of the second control element to deliver a trigger voltage to the second conduction device to render it conducting;

means responsive to conduction of either of said conduction devices for energizing the motor from the line;

means responsive to conduction of said first conduction device to maintain it conducting after manual engagement with the fist control element is terminated; and means responsive to conduction of said second conduction device to render said first conduction device non-conducting.

40. The combination of claim 39 wherein said portable electric tool is a tool such as a portable electric drill, and said handle means is a pistol grip type handle;

said second control element is mounted on the handle for convenient engagement by the index finger of a hand gripping the handle; and said first control element is mounted adjacent the end of the handle for convenient engagement by the little finger of the hand gripping the handle.

* * * * *